United States Patent
Horie

(10) Patent No.: US 12,528,350 B2
(45) Date of Patent: Jan. 20, 2026

(54) VEHICLE

(71) Applicant: SUBARU CORPORATION, Tokyo (JP)

(72) Inventor: Shinya Horie, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 350 days.

(21) Appl. No.: 17/671,012

(22) Filed: Feb. 14, 2022

(65) Prior Publication Data

US 2022/0274485 A1 Sep. 1, 2022

(30) Foreign Application Priority Data

Feb. 26, 2021 (JP) .................................. 2021-029510

(51) Int. Cl.
*B60K 25/02* (2006.01)
*B60K 25/00* (2006.01)
(Continued)

(52) U.S. Cl.
CPC .............. *B60K 25/02* (2013.01); *B60K 25/00* (2013.01); *B60W 10/02* (2013.01); *B60W 10/06* (2013.01);
(Continued)

(58) Field of Classification Search
CPC ................. B60W 10/06; B60W 10/02; B60W 2510/186; B60W 2510/244;
(Continued)

(56) References Cited

U.S. PATENT DOCUMENTS 7,957,884 B2 * 6/2011 Wakashiro ............ B60W 30/16
701/96
9,010,469 B2 * 4/2015 Saito ...................... B60L 53/00
180/65.285
(Continued)

FOREIGN PATENT DOCUMENTS

CN 212400884 U * 1/2021
DE 102013216367 A 2/2015
(Continued)

OTHER PUBLICATIONS

Japanese Office Action, dated Dec. 17, 2024 in Japanese Application No. 2021-029510 and English Translation thereof.
(Continued)

*Primary Examiner* — John Olszewski
*Assistant Examiner* — Aimee Tran Nguyen
(74) *Attorney, Agent, or Firm* — McGinn I.P.Law Group, PLLC

(57) ABSTRACT

A vehicle includes an engine, an electric generator, a power transmission device, a clutch, and a power generation controller. The electric generator is coupled to the engine. The power transmission device is configured to transmit driving power of the engine to a vehicle's driving wheel. The clutch is provided in the power transmission device and switchable between an engaged state in which the driving power of the engine is transmitted to the driving wheel and a disengaged state in which the driving power of the engine is not transmitted to the driving wheel. The power generation controller is configured to drive the engine and cause the electric generator to generate electric power by using the driving power of the engine. The clutch is switched to the disengaged state when a driver who drives the vehicle is determined to intend to stop the vehicle for a predetermined period or longer.

18 Claims, 5 Drawing Sheets

(51) Int. Cl.
*B60W 10/02* (2006.01)
*B60W 10/06* (2006.01)
*F16H 59/10* (2006.01)
*F16H 61/18* (2006.01)
*F16H 63/34* (2006.01)

(52) U.S. Cl.
CPC .............. *F16H 59/10* (2013.01); *F16H 61/18* (2013.01); *B60W 2510/186* (2013.01); *B60W 2510/244* (2013.01); *B60W 2520/04* (2013.01); *B60W 2710/021* (2013.01); *B60W 2710/248* (2013.01); *F16H 63/3416* (2013.01)

(58) Field of Classification Search
CPC ......... B60W 2520/04; B60W 2540/16; B60W 2710/021; B60W 2710/248; F16H 59/10; F16H 59/105; F16H 59/0217; B60K 17/02; B60K 25/02

See application file for complete search history.

(56) References Cited

U.S. PATENT DOCUMENTS

| | | |
|---|---|---|
| 2004/0036769 A1 | 2/2004 | Sadahiro |
| 2016/0090078 A1* | 3/2016 | Satomura .............. B60W 10/06 903/946 |
| 2018/0056976 A1* | 3/2018 | Kim ....................... B60K 6/442 |
| 2022/0009476 A1* | 1/2022 | Cho ....................... B60W 10/02 |

FOREIGN PATENT DOCUMENTS

| | | |
|---|---|---|
| JP | 2001-041073 A | 2/2001 |
| JP | 2001-069610 A | 3/2001 |
| JP | 2004-082835 A | 3/2004 |
| JP | 2012-046120 A | 3/2012 |
| JP | 2013-119347 A | 6/2013 |
| JP | 2015-199410 A | 11/2015 |
| JP | 2016-068740 | 5/2016 |
| WO | WO-2016134899 A1 * | 9/2016 .......... B60W 50/082 |

OTHER PUBLICATIONS

Japanese Office Action, dated Mar. 25, 2025 in Japanese Application No. 2021-029510 and English Translation Thereof.

* cited by examiner

VEHICLE

CROSS-REFERENCE TO RELATED APPLICATIONS

The present application claims priority from Japanese Patent Application No. 2021-029510 filed on Feb. 26, 2021, the entire contents of which are hereby incorporated by reference.

BACKGROUND

The disclosure relates to a vehicle.

There is a technology for generating electric power by using driving power of an engine of a vehicle (see, for example, Japanese Unexamined Patent Application Publication No. 2016-068740).

The power generation may be performed during a stop of the vehicle. Various losses may occur in the power generation during the stop of the vehicle. It is desirable to improve power generation efficiency during the stop of the vehicle.

SUMMARY

An aspect of the disclosure provides a vehicle including an engine, an electric generator, a power transmission device, a clutch, and a power generation controller. The electric generator is coupled to the engine. The power transmission device is configured to transmit driving power of the engine to a driving wheel of the vehicle. The clutch is provided in the power transmission device and switchable between an engaged state in which the driving power of the engine is transmitted to the driving wheel and a disengaged state in which the driving power of the engine is not transmitted to the driving wheel. The power generation controller is configured to drive the engine and cause the electric generator to generate electric power by using the driving power of the engine. The clutch is switched to the disengaged state in a case where a driver who drives the vehicle is determined to intend to stop the vehicle for a predetermined period or longer.

An aspect of the disclosure provides a vehicle including an engine, an electric generator, a power transmission device, a clutch, a select lever of transmission, and a power generation controller. The electric generator is coupled to the engine. The power transmission device is configured to transmit driving power of the engine to a driving wheel of the vehicle. The clutch is provided in the power transmission device and switchable between an engaged state in which the driving power of the engine is transmitted to the driving wheel and a disengaged state in which the driving power of the engine is not transmitted to the driving wheel. The select lever of transmission has, as shift positions, a parking range, a reverse range, a neutral range, a drive range, and a power generation-only range different from the parking range, the reverse range, the neutral range, and the drive range. The power generation controller is configured to drive the engine and cause the electric generator to generate electric power by using the driving power of the engine. The clutch is switched to the disengaged state when the shift position of the select lever of transmission is the power generation-only range.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
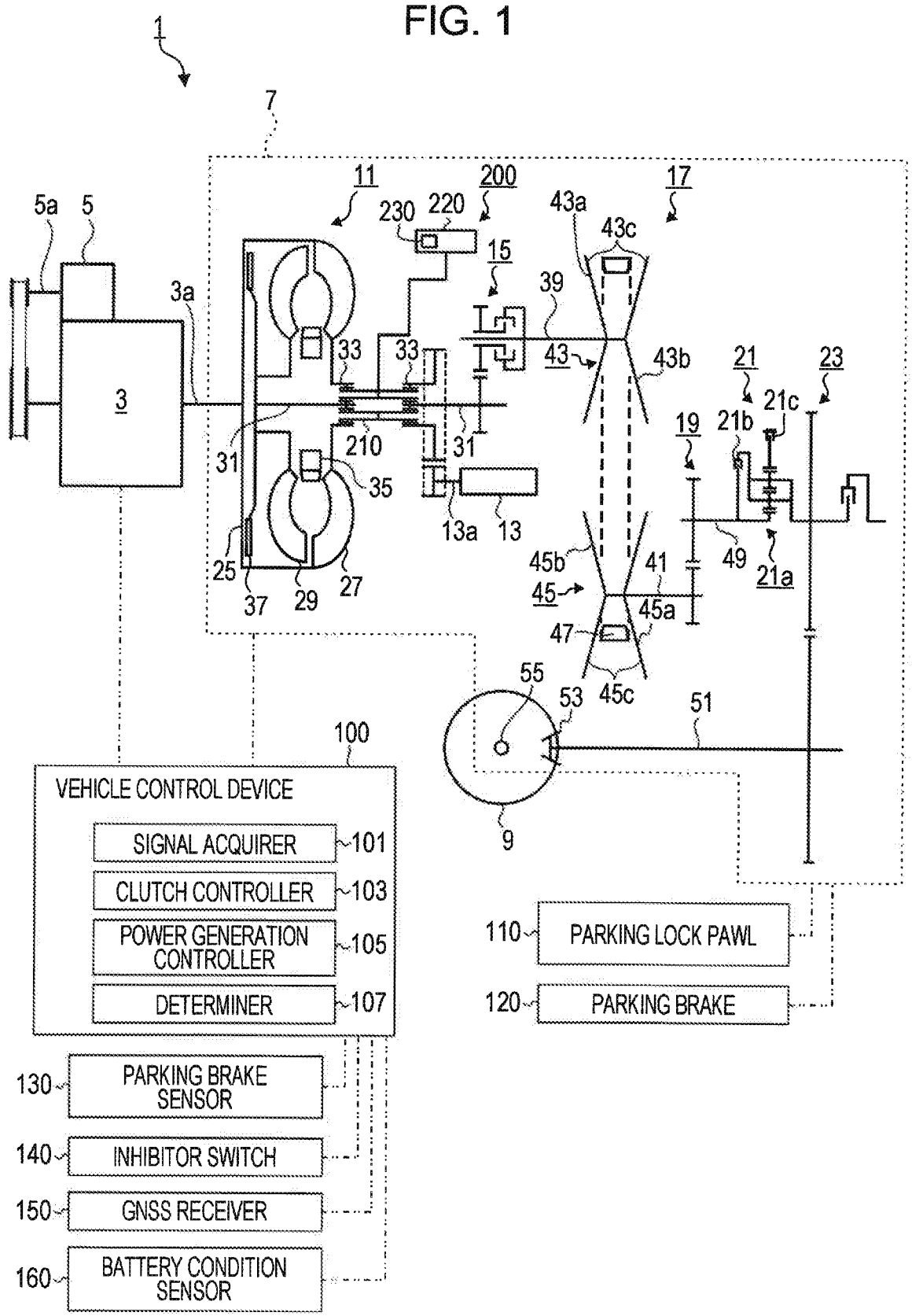
FIG. 1 is a diagram illustrating the structure of a vehicle.

FIG. 1 is a diagram illustrating the structure of vehicle 1. As illustrated in FIG. 1, the vehicle 1 includes an engine 3, an integrated starter generator (ISG) 5, a power transmission device 7, a driving wheel (wheel) 9, and a vehicle control device 100.

Examples of the engine 3 include a reciprocating engine that rotates a crankshaft 3a by reciprocating a piston with a combustion pressure generated in a combustion chamber. The crankshaft 3a is coupled to the power transmission device 7.

The ISG 5 is an electric generator with a motor function. The ISG 5 has a rotational shaft 5a coupled to the crankshaft 3a of the engine 3 via a pulley belt. The ISG 5 has a starter function and a generator function to start (restart) the engine 3 and generate electric power by using driving power of the engine 3.

The power transmission device 7 includes a torque converter 11, a mechanical oil pump 13, a first gear train 15, a continuously variable transmission 17, a second gear train 19, a forward/reverse travel switching device 21, a third gear train 23, and a clutch mechanism 200. The power transmission device 7 transmits the driving power of the engine 3 to the driving wheel 9.

The torque converter 11 includes a front cover 25, a pump impeller 27, a turbine liner 29, a turbine shaft 31, a pump shaft 33, a stator 35, and a clutch plate 37. The torque converter 11 is filled with oil.

The front cover 25 is coupled to the crankshaft 3a, and rotates together with the crankshaft 3a The pump impeller 27 is fixed to the inner surface of the front cover 25. The turbine liner 29 faces the pump impeller 27 in the front cover 25.

The pump impeller 27 and the turbine liner 29 have many blades. The turbine liner 29 is coupled to the turbine shaft 31, and rotates together with the turbine shaft 31.

The pump shaft 33 has a hollow cylindrical shape, and is coupled to the pump impeller 27. The pump shaft 33 rotates together with the pump impeller 27. The turbine shaft 31 is inserted through the pump shaft 33 with a clearance. The stator 35 is disposed on the inner periphery between the pump impeller 27 and the turbine liner 29.

When the crankshaft 3a rotates, the front cover 25 and the pump impeller 27 rotate together with the crankshaft 3a. When the pump impeller 27 rotates, the oil is sent toward the outer periphery of the pump impeller 27, and flows toward the turbine liner 29 along the inner peripheral surface of the front cover 25.

The oil flowing into the turbine liner 29 causes the turbine liner 29 to rotate. When the turbine liner 29 rotates, the turbine shaft 31 rotates together with the turbine liner 29. Thus, the driving power is transmitted from the crankshaft 3a to the turbine shaft 31.

The stator 35 sends the oil from the turbine liner 29 toward the pump impeller 27. The stator 35 refluxes the oil to the pump impeller 27 to promote the rotation of the pump impeller 27. Thus, the torque converter 11 can increase a torque to be transmitted from an input side (crankshaft 3a) to an output side (turbine shaft 31).

The clutch plate 37 is fixed to the turbine shaft 31. The clutch plate 37 faces the inner surface of the front cover 25. When the clutch plate 37 is pushed against the inner surface of the front cover 25 by a hydraulic pressure, the clutch plate 37 directly couples the crankshaft 3a and the turbine shaft 31. Thus, it is possible to improve the efficiency of transmission of a driving force from the crankshaft 3a to the turbine shaft 31.

The clutch plate 37 is abuttable against the inner surface of the front cover 25, and a push force against the inner surface of the front cover 25 is controlled by controlling the hydraulic pressure. As the push force decreases, the clutch plate 37 abuts against the inner surface of the front cover 25 while slipping. Thus, the clutch plate 37 can adjust the driving power to be transmitted from the crankshaft 3a to the turbine shaft 31.

Figure 2:
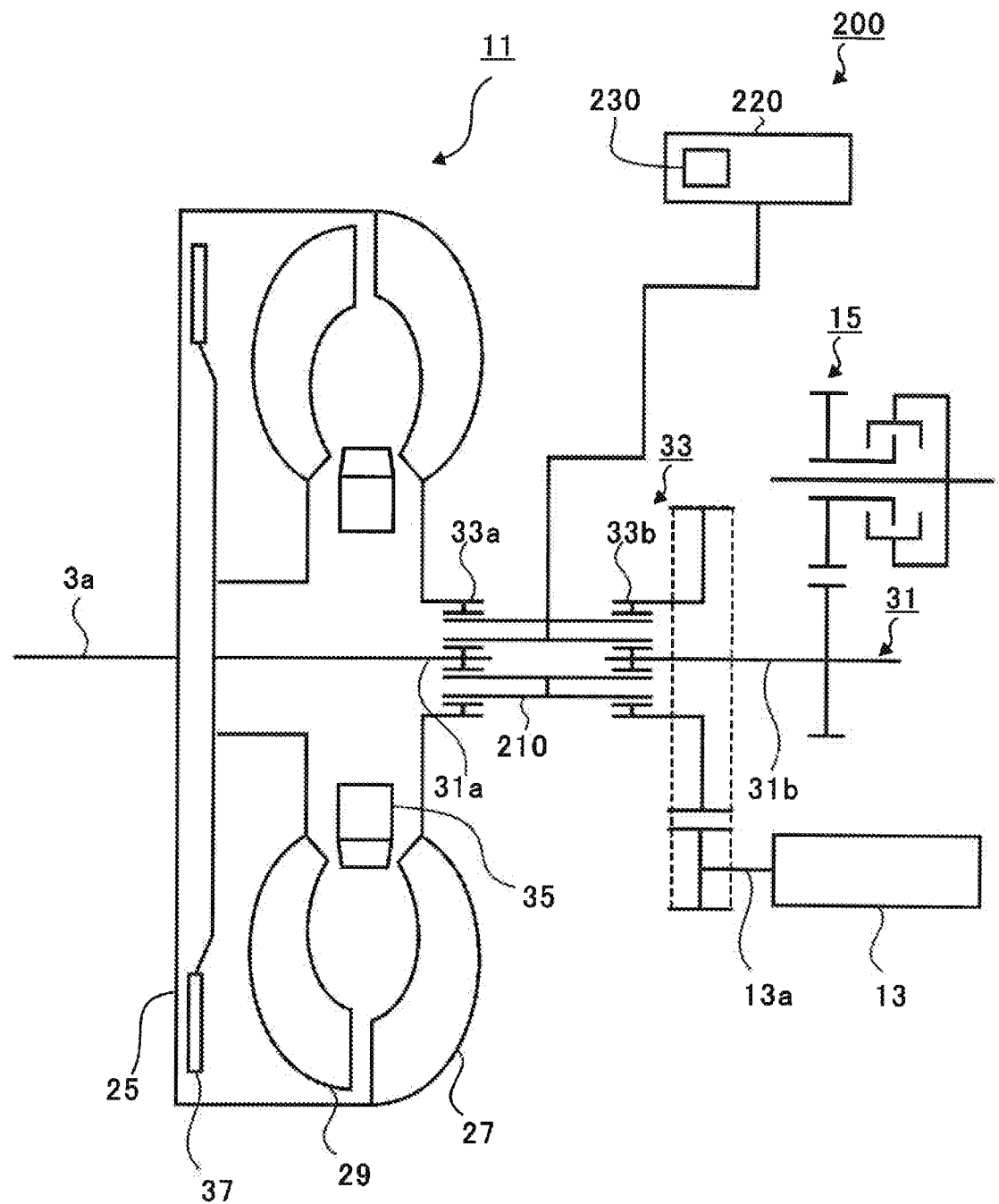
FIG. 2 is a first diagram illustrating the structure of a clutch mechanism according to an embodiment.
Figure 3:
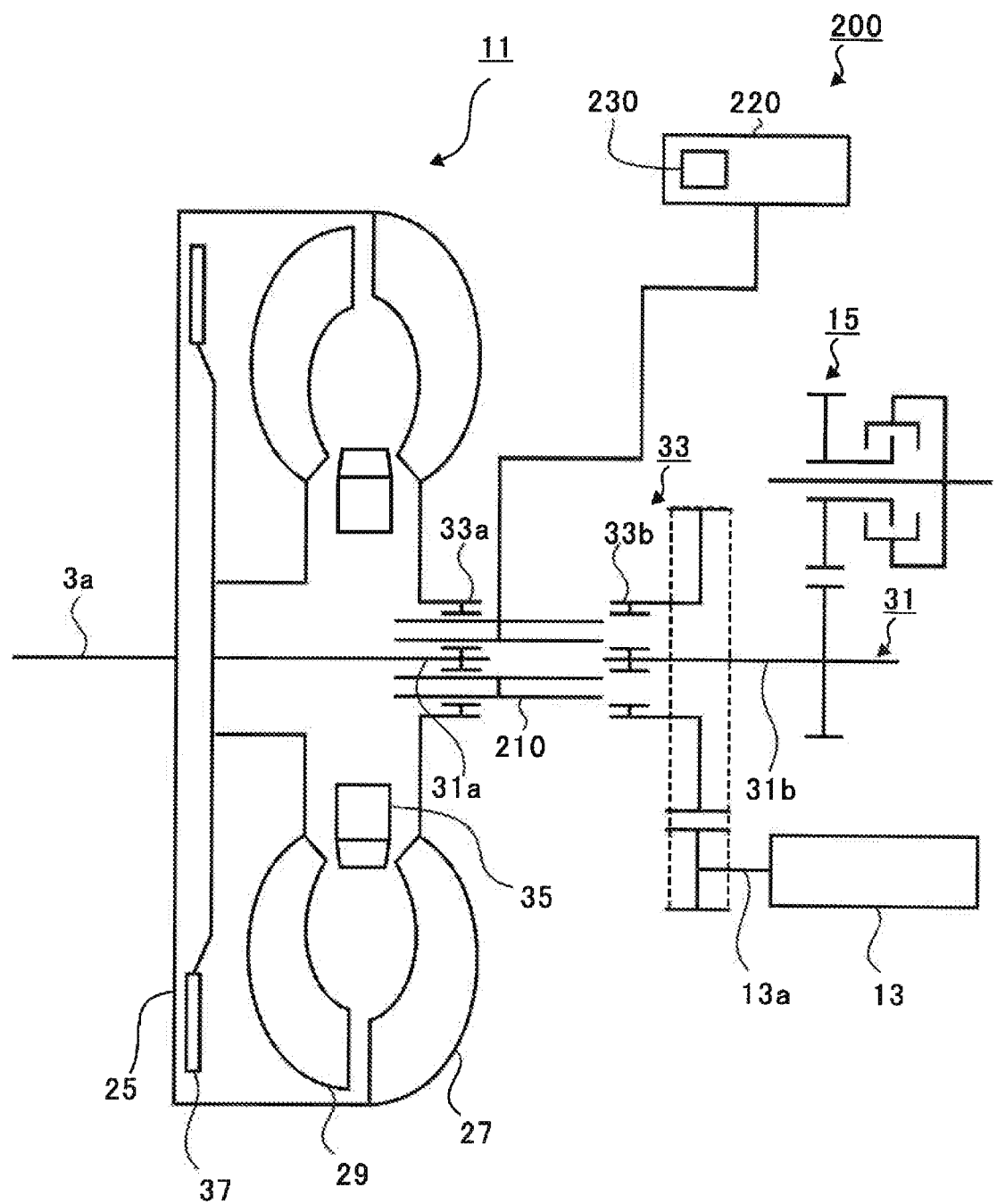
FIG. 3 is a second diagram illustrating the structure of the clutch mechanism according to the embodiment.

FIG. 2 is a first diagram illustrating the structure of the clutch mechanism 200 according to this embodiment. FIG. 3 is a second diagram illustrating the structure of the clutch mechanism 200 according to this embodiment. As illustrated in FIG. 2 and FIG. 3, the turbine shaft 31 of this embodiment is divided into a first turbine shaft 31a and a second turbine shaft 31b. The first turbine shaft 31a is coupled to the turbine liner 29. The second turbine shaft 31b is coupled to the first gear train 15. The pump shaft 33 is divided into a first pump shaft 33a and a second pump shaft 33b. The first pump shaft 33a is coupled to the pump impeller 27. The second pump shaft 33b is coupled to a rotational shaft 13a of the mechanical oil pump 13 via a pulley belt.

The clutch mechanism 200 includes a clutch 210 and a clutch driver 220. The clutch 210 has a cylindrical shape, and has internal teeth on the inner peripheral surface and external teeth on the outer peripheral surface. The first turbine shaft 31a and the second turbine shaft 31b have external teeth on their outer peripheral surfaces. The external teeth are engageable with the internal teeth of the clutch 210. The first pump shaft 33a and the second pump shaft 33b have internal teeth on their inner peripheral surfaces. The internal teeth are engageable with the external teeth of the clutch 210.

The clutch driver 220 is coupled to the clutch 210, and can move the clutch 210 in an axial direction of the turbine shaft 31. In this embodiment, the clutch driver 220 includes a motor, and can automatically move the clutch 210 in the axial direction by the motor.

The motor may be omitted from the clutch driver 220. The clutch driver 220 includes a select lever 230 of transmission (hereinafter referred to simply as "select lever 230"). The clutch 210 is movable in the axial direction in response to an operation on the select lever 230. Therefore, a driver may operate the select lever 230 to manually move the clutch 210 in the axial direction.

FIG. 2 illustrates an initial state of the clutch 210 before the movement of the clutch 210 by the clutch driver 220. As illustrated in FIG. 2, the internal teeth of the clutch 210 engage with the external teeth of the first turbine shaft 31a and the second turbine shaft 31b, and the external teeth of the clutch 210 engage with the internal teeth of the first pump shaft 33a and the second pump shaft 33b. In the engaged state of the clutch 210, the clutch 210 can transmit a rotational force of the first turbine shaft 31a to the second turbine shaft 31b. The clutch 210 can transmit a rotational force of the first pump shaft 33a to the second pump shaft 33b. As a result, the clutch 210 can transmit the driving power from the engine 3 to the mechanical oil pump 13 and the first gear train 15.

FIG. 3 illustrates the clutch 210 moved by the clutch driver 220. When the clutch 210 in the initial state moves in the axial direction as illustrated in FIG. 3, the internal teeth of the clutch 210 disengage from the external teeth of the second turbine shaft 31b. The external teeth of the clutch 210 disengage from the internal teeth of the second pump shaft 33b. In the disengaged state, the clutch 210 cannot transmit the rotational force of the first turbine shaft 31a to the second turbine shaft 31b. The clutch 210 cannot transmit the rotational force of the first pump shaft 33a to the second pump shaft 33b. As a result, the clutch 210 cannot transmit the driving power from the engine 3 to the mechanical oil pump 13 and the first gear train 15.

The mechanical oil pump 13 has the rotational shaft 13a coupled to the pump shaft 33 via the pulley belt. The mechanical oil pump 13 is driven to rotate by the driving power of the engine 3 that is input via the pump shaft 33, thereby generating a hydraulic pressure. For example, the generated hydraulic pressure is supplied to the continuously variable transmission 17.

The first gear train 15 couples the turbine shaft 31 to a primary shaft 39.

The first gear train 15 reduces a rotation speed of the turbine shaft 31, and transmits the rotation to the primary shaft 39.

The continuously variable transmission 17 includes the primary shaft 39, a secondary shaft 41, a primary pulley 43, a secondary pulley 45, and a belt 47. The primary shaft 39 is coupled to the first gear train 15. The secondary shaft 41 is coupled to the second gear train 19. The secondary shaft 41 is substantially parallel to the primary shaft 39.

The primary pulley 43 is coupled to the primary shaft 39, and rotates together with the primary shaft 39. The secondary pulley 45 is coupled to the secondary shaft 41, and rotates together with the secondary shaft 41.

The belt 47 is a chain belt obtained by coupling link plates with pins. For example, the belt 47 may be a metal belt obtained by sandwiching a plurality of rotary segments (elements) by two rings. The belt 47 is looped between the primary pulley 43 and the secondary pulley 45, and transmits the driving power between the primary pulley 43 and the secondary pulley 45.

The primary pulley 43 includes a fixed sheave 43a and a movable sheave 43b. The fixed sheave 43a faces the movable sheave 43b in an axial direction of the primary shaft 39. The fixed sheave 43a and the movable sheave 43b have facing surfaces 43c that face each other.

Each facing surface 43c has a substantially conical shape. The facing surfaces 43c define a groove where the belt 47 is looped. The position of the movable sheave 43b in the axial direction of the primary shaft 39 is changeable by the hydraulic pressure of the oil supplied from the mechanical oil pump 13.

The secondary pulley 45 includes a fixed sheave 45a and a movable sheave 45b. The fixed sheave 45a faces the movable sheave 45b in an axial direction of the secondary shaft 41. The fixed sheave 45a and the movable sheave 45b have facing surfaces 45c that face each other.

Each facing surface 45c has a substantially conical shape. The facing surfaces 45c define a groove where the belt 47 is looped. The position of the movable sheave 45b in the axial direction of the secondary shaft 41 is changeable by the hydraulic pressure of the oil supplied from the mechanical oil pump 13.

In the primary pulley 43, a facing distance between the fixed sheave 43a and the movable sheave 43b is variable. In the secondary pulley 45, a facing distance between the fixed sheave 45a and the movable sheave 45b is variable. The facing distance between the facing surfaces 43c and the facing distance between the facing surfaces 45c are shorter on a radially inner side and longer on a radially outer side. When the movable sheave 43b and the movable sheave 45b move in the axial direction, the loop positions of the belt 47 change in a radial direction.

As the facing distance between the facing surfaces 43c increases in the primary pulley 43, the loop position of the belt 47 is shifted radially inward and the winding diameter of the belt 47 decreases. As the facing distance between the facing surfaces 43c decreases in the primary pulley 43, the loop position of the belt 47 is shifted radially outward and the winding diameter of the belt 47 increases.

As the facing distance between the facing surfaces 45c increases in the secondary pulley 45, the loop position of the belt 47 is shifted radially inward and the winding diameter of the belt 47 decreases. As the facing distance between the facing surfaces 45c decreases in the secondary pulley 45, the loop position of the belt 47 is shifted radially outward and the winding diameter of the belt 47 increases.

In this manner, the continuously variable transmission 17 changes a speed ratio between the primary shaft 39 and the secondary shaft 41 continuously (steplessly). The continuously variable transmission 17 transmits the driving power from the engine 3 toward the driving wheel 9 via the torque converter 11 and the first gear train 15.

The second gear train 19 couples the secondary shaft 41 to a gear shaft 49, The second gear train 19 reduces a rotation speed of the secondary shaft 41, and transmits the rotation to the gear shaft 49.

The forward/reverse travel switching device 21 is disposed on the gear shaft 49 between the second gear train 19 and the third gear train 23. The forward/reverse travel switching device 21 includes a double-pinion planetary gear train 21a, an input clutch (forward travel clutch) 21b, and a reverse travel brake 21c. When the input clutch 21b and the reverse travel brake 21c are disengaged, the forward/reverse travel switching device 21 is in a neutral state and interrupts transmission of the driving power between the gear shaft 49 and a drive pinion shaft 51. When the input clutch 21b is engaged and the reverse travel brake 21c is disengaged, the forward/reverse travel switching device 21 transmits the driving power from the gear shaft 49 to the drive pinion shaft 51. When the input clutch 21b is disengaged and the reverse travel brake 21c is engaged, the forward/reverse travel switching device 21 transmits the driving power from the gear shaft 49 to the drive pinion shaft 51 in reverse.

The third gear train 23 couples the gear shaft 49 to the drive pinion shaft 51. The third gear train 23 reduces a rotation speed of the gear shaft 49, and transmits the rotation to the drive pinion shaft 51.

The drive pinion shaft 51 is coupled to the driving wheel 9 via a differential 53 and an axle shaft 55. The driving force from the secondary shaft 41 is transmitted to the driving wheel 9 via the second gear train 19, the forward/reverse travel switching device 21, the third gear train 23, the drive pinion shaft 51, the differential 53, and the axle shaft 55.

The power transmission device 7 of this embodiment includes a parking gear (not illustrated) and a parking lock pawl (rotation restrictor) 110. The parking gear is provided on any one of the turbine shaft 31, the primary shaft 39, the secondary shaft 41, the gear shaft 49, and the drive pinion shaft 51. The parking lock pawl 110 is engageable with the parking gear, and locks rotation of the shaft having the parking gear when the parking lock pawl 110 engages with the parking gear.

The vehicle 1 of this embodiment includes a parking brake (rotation restrictor) 120. For example, the parking brake 120 includes a lever, and locks rotation of the driving wheel 9 when the lever is pulled up.

The vehicle control device 100 is a microcomputer including a central processing unit (CPU), a ROM that stores programs and the like, and a RAM serving as a working area, and centrally controls the entire vehicle 1. In this embodiment, the vehicle control device 100 functions as a signal acquirer 101, a clutch controller 103, a power generation controller 105, and a determiner 107.

A parking brake sensor 130, an inhibitor switch 140, a global navigation satellite system (GNSS) receiver 150, and a battery condition sensor 160 are coupled to the vehicle control device 100. The parking brake sensor 130 detects an operation status of the parking brake 120, and outputs, to the vehicle control device 100, a detection signal indicating the operation status of the parking brake 120 (parking brake signal). The inhibitor switch 140 detects a shift position of the select lever 230, and outputs a detection signal indicating the shift position to the vehicle control device 100. The GNSS receiver 150 detects a position of the vehicle 1, such as latitude and longitude, and outputs a detection signal indicating the position of the vehicle 1 to the vehicle control device 100. The battery condition sensor 160 detects conditions of a battery (not illustrated) mounted on the vehicle 1, such as a charge level (SOC), discharge performance (SOF), and a remaining charge level (SOH), and outputs a detection signal indicating the conditions of the battery to the vehicle control device 100.

The signal acquirer 101 acquires detection signals output from various sensors. For example, the signal acquirer 101 acquires the detection signals output from the parking brake sensor 130, the inhibitor switch 140, the GNSS receiver 150, and the battery condition sensor 160.

The clutch controller 103 controls the motor of the clutch driver 220 to control drive of the clutch 210. The clutch controller 103 controls the clutch 210 to switch the engaged state and the disengaged state. As described later, the clutch controller 103 controls the clutch 210 into the disengaged state when the determiner 107 determines that the driver intends to stop the vehicle for a predetermined period or longer.

For example, the power generation controller 105 drives the engine 3 and causes the ISG 5 to generate electric power by using the driving power of the engine 3 when the charge level of the battery is lower than a predetermined value.

The determiner 107 determines whether the driver intends to stop the vehicle for the predetermined period or longer. For example, the determiner 107 determines that the driver intends to stop the vehicle for the predetermined period or longer when the parking lock pawl 110 locks the rotation of the shaft of the power transmission device 7. For example, the determiner 107 determines that the driver intends to stop the vehicle for the predetermined period or longer when the parking brake 120 locks the rotation of the driving wheel 9. The determiner 107 determines whether the driver intends to stop the vehicle for the predetermined period or longer based on positional information of the vehicle 1. For example, the determiner 107 determines that the driver intends to stop the vehicle for the predetermined period or longer when the vehicle 1 is located in a parking lot.

There is a technology for generating electric power by using the driving power of the engine of the vehicle. The power generation may be performed during a stop of the vehicle. Various losses may occur in the power generation during the stop of the vehicle. It is desirable to improve power generation efficiency during the stop of the vehicle.

The vehicle 1 of this embodiment has a power generation-only shift position, and causes the clutch 210 to make transition from the engaged state to the disengaged state when the shift position is the power generation-only shift position. The power generation can be performed when the clutch 210 is in the disengaged state and the charge level of the battery is lower than the predetermined value.

Figure 4:
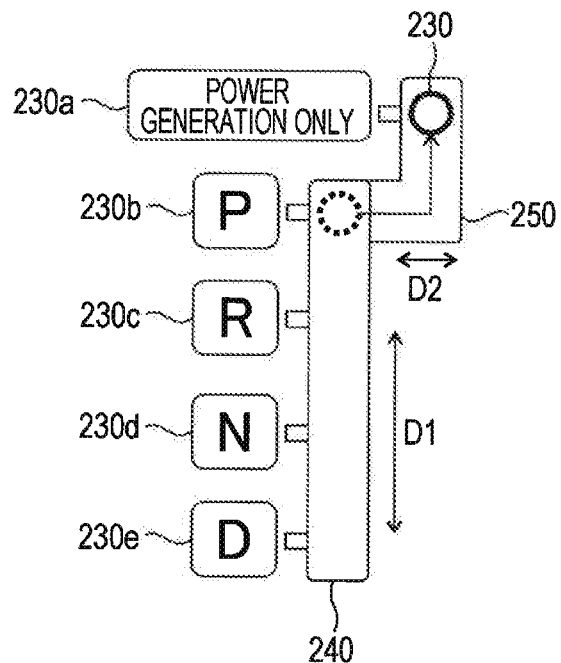
FIG. 4 is a diagram illustrating the structure of a select lever of transmission according to the embodiment.

FIG. 4 is a diagram illustrating the structure of the select lever 230 according to this embodiment. As illustrated in FIG. 4, the select lever 230 is switchable among a power generation-only range 230a, a parking range (P-range) 230b, a reverse range (R-range) 230c, a neutral range (N-range) 230d, and a drive range (D-range) 230e. In this embodiment, the select lever 230 has the power generation-only range 230a as the shift position in addition to the P-range 230b, the R-range 230c, the N-range 230d, and the D-range 230e. The power generation-only range 230a differs from the P-range 230b, the R-range 230c, the N-range 230d, and the D-range 230e.

The P-range 230b, the R-range 230c, the N-range 230d, and the D-range 230e are set on a first path 240 extending in a predetermined extending direction D1. The power generation-only range 230a is set on a second path 250 extending from the first path 240 in a direction D2 intersecting the extending direction D1. Thus, it is possible to reduce an occupant's erroneous operation that may cause switching of the select lever 230 to the power generation-only range 230a.

In this embodiment, the select lever 230 is not switchable to the power generation-only range 230a unless the select lever 230 is temporarily set to the P-range 230b. When the shift position is the P-range 230b, determination may be made that the driver in the vehicle 1 intends to stop the vehicle for the predetermined period or longer. The clutch 210 is switched to the disengaged state when determination may be made that the driver intends to stop the vehicle for the predetermined period or longer. The case where determination may be made that the driver intends to stop the vehicle for the predetermined period or longer includes a case where the shift position of the select lever 230 is switched to the power generation only range 230a.

The select lever 230 may be switchable to the power generation-only range 230a via a range other than the P-range 230b. In this embodiment, the switching to the power generation-only range 230a is permitted when the rotation of at least one of the driving wheels 9 or the power transmission device 7 is locked by either one of the rotation restrictors 110 and 120. In other words, the switching to the power generation-only range 230a is prohibited when the lock by the rotation restrictors 110 and 120 is undone. Thus, it is possible to suppress a decrease in a restart response of the vehicle 1 when the lock by the rotation restrictors 110 and 120 is undone.

As illustrated in FIG. 4, the second path 250 serving as the switching path from the P-range 230b to the power generation-only range 230a has an L-shape. The switching path to the power generation-only range 230a may have other shapes such as an S-shape and a Z-shape.

Figure 5:
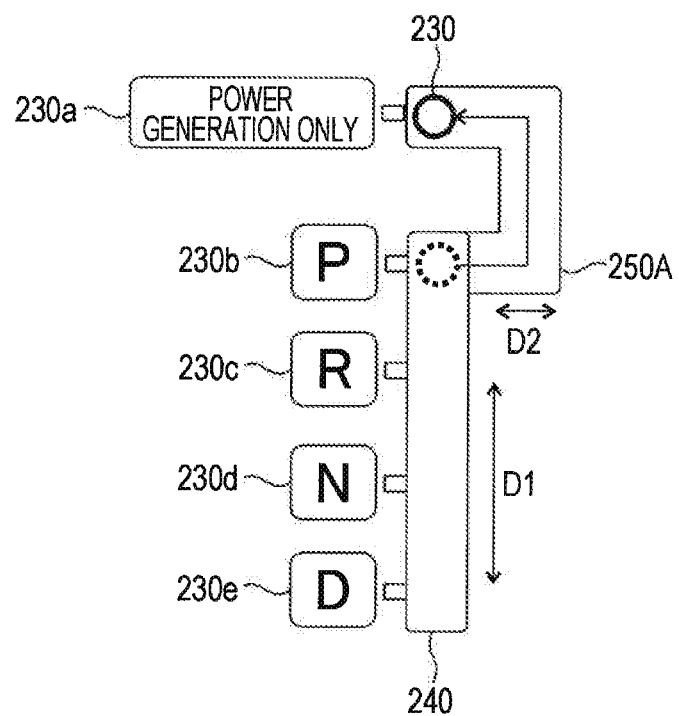
FIG. 5 is a diagram illustrating the structure of a select lever of transmission according to a modified example.

FIG. 5 is a diagram illustrating the structure of a select lever 230 according to a modified example. As illustrated in FIG. 5, a second path 250A serving as the switching path to the power generation-only range 230a has a U-shape. Since the switching path has the U-shape, the driver's erroneous operation can further be reduced compared with the L-shape illustrated in FIG. 4.

In the P-range 230b in FIG. 4 and FIG. 5, the parking lock pawl 110 engages with the parking gear to lock the rotation of the shaft of the power transmission device 7. Thus, the vehicle 1 can continuously be stopped while the vehicle 1 is parked and the driver is out of the vehicle 1. In the power generation-only range 230a as well, the vehicle 1 can be parked by keeping the engagement between the parking lock pawl 110 and the parking gear. In the P-range 230b, the clutch 210 is in the engaged state. In the P-range 230b, the clutch 210 may be switched to the disengaged state. For example, in the P-range 230b, the clutch 210 may be switched to the disengaged state when the vehicle 1 is located in a parking lot or when the parking brake 120 is applied.

In this embodiment, when the select lever 230 is shifted from the P-range 230b to the power generation-only range 230a, the clutch 210 makes transition from the engaged state illustrated in FIG. 2 to the disengaged state illustrated in FIG. 3 in association with the shift of the select lever 230. That is, when the shift position of the select lever 230 is the power generation-only range 230a, the clutch 210 is switched to the disengaged state. When the select lever 230 is shifted from the power generation-only range 230a to the P-range 230b, the clutch 210 makes transition from the disengaged state illustrated in FIG. 3 to the engaged state illustrated in FIG. 2 in association with the shift of the select lever 230.

The power generation controller 105 makes determination about the shift position based on the detection signal from the inhibitor switch 140. The power generation controller 105 determines whether the charge level (OC) of the battery is lower than the predetermined value based on the detection signal from the battery condition sensor 160.

When the charge level of the battery is lower than the predetermined value and the shift position is either one of the power generation-only range 230a and the P-range 230b, the power generation controller 105 permits power generation and drives the ISG 5 to generate electric power by using the driving power of the engine 3, thereby charging the battery. The power generation controller 105 permits power generation also when the parking brake 120 is applied. In other words, the power generation controller 105 permits power generation during parking in which the rotation of either one of the driving wheels 9 and the shaft of the power transmission device 7 is locked. In some embodiments, the power generation controller 105 permits power generation when the clutch 210 is in the disengaged state.

Figure 6:
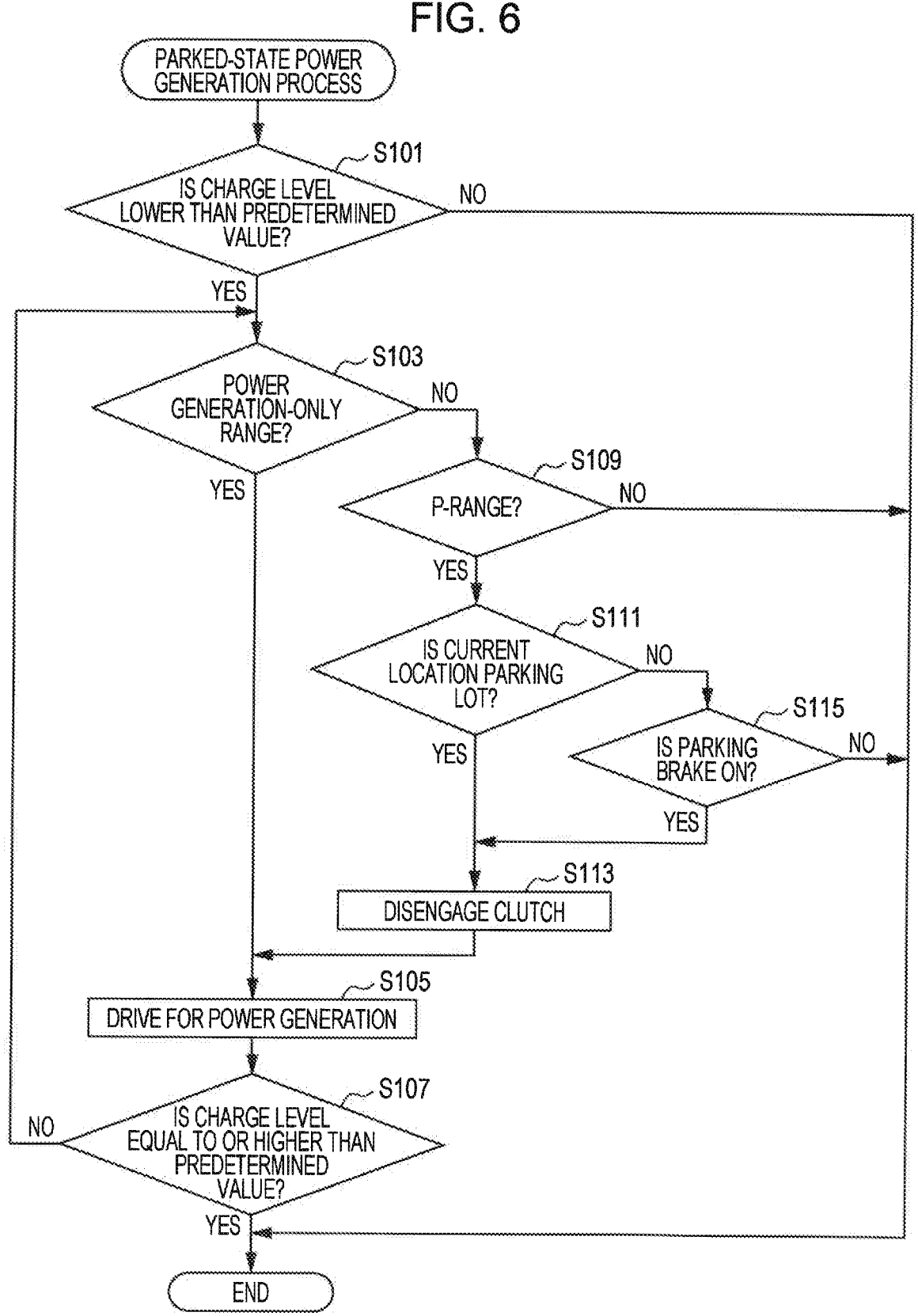
FIG. 6 is a flowchart of a power generation control process.

Next, a description is made about a power generation control process to be executed by the power generation controller 105 during parking. FIG. 6 is a flowchart of the power generation control process.

As illustrated in FIG. 6, the power generation controller 105 determines whether the charge level of the battery is lower than the predetermined value (Step S101). When the charge level is lower than the predetermined value (YES in Step S101), the power generation controller 105 determines whether the shift position is the power generation-only range 230a (Step S103). When the shift position is the power generation-only range 230a, the clutch 210 is driven from the engaged state illustrated in FIG. to the disengaged state illustrated in FIG. 3 through a manual operation on the select lever 230. In this state, the power generation controller 105 drives the engine 3 and drives the ISG 5 to generate electric power by using the driving power of the engine 3 (Step S105). The power generation controller 105 determines whether the charge level of the battery is equal to or higher than the predetermined value (Step S107). When the charge level is lower than the predetermined value (NO in Step S107), the power generation controller 105 executes the processes of Steps S103 and S105 again. When the charge level of the battery is equal to or higher than the predetermined value (NO in Step S101 or YES in Step S107), the power generation controller 105 terminates the power generation control process.

When the shift position is not the power generation-only range 230a (NO in Step S103), the power generation controller 105 determines whether the shift position is the P-range 230b (Step S109). When the shift position is the P-range 230b (YES in Step S109), the power generation controller 105 determines whether the current location of the vehicle 1 is a parking lot based on the detection signal from the GNSS receiver 150 (Step S111). When the shift position is not the P-range 230b (NO in Step S109), the power generation controller 105 terminates the power generation control process.

When the current location is the parking lot (YES in Step S111), the clutch controller 103 drives the motor of the clutch driver 220 to drive the clutch 210 from the engaged state illustrated in FIG. 2 to the disengaged state illustrated in FIG. 3 (Step S113), and proceeds to the process of Step S105.

When the current location is not the parking lot (NO in Step S111), the power generation controller 105 determines whether the parking brake 120 is applied based on the detection signal from the parking brake sensor 130 (Step S115). When the parking brake 120 is applied (YES in Step S115), the power generation controller 105 proceeds to the process of Step S113. When the parking brake 120 is not applied (NO in Step S115), the power generation controller 105 terminates the power generation control process.

As described above, the clutch 210 of this embodiment is switched from the engaged state to the disengaged state when determination may be made that the driver intends to stop the vehicle for the predetermined period or longer. When the charge level of the battery is lower than the predetermined value, the power generation controller 105 drives the engine 3 and drives the ISG 5 to generate electric power. Thus, it is possible to improve the power generation efficiency when the power generation is performed while the vehicle 1 is parked.

The clutch mechanism 200 is provided on a power transmission path between the torque converter 11 and each of the mechanical oil pump 13 and the first gear train 15. Therefore, the driving power of the engine 3 is not transmitted from the torque converter 11 to each of the mechanical oil pump 13 and the first gear train 15 while the ISG 5 is driven to generate electric power. Thus, it is possible to reduce energy losses such as a friction loss, a stirring loss, and a hydraulic pressure loss that may occur at the mechanical oil pump 13, the first gear train 15, and subsequent stages. As a result, it is possible to suppress a decrease in the power generation efficiency of the ISG 5.

When the clutch mechanism 200 interrupts the power transmission path between the torque converter 11 and each of the mechanical oil pump 13 and the first gear train 15, the restart response of the vehicle 1 may decrease. Therefore, the clutch mechanism 200 is disengaged when the driver has parked the vehicle 1 intending to stop the vehicle continuously for the predetermined period or longer.

In this embodiment, when the clutch 210 is driven through a manual operation on the select lever 230, energy consumption can be reduced compared with a case where the clutch 210 is driven by the motor.

Although the exemplary embodiment of the disclosure is described above with reference to the accompanying drawings, the embodiment of the disclosure is not limited to this embodiment. It is understood that various modifications and revisions are conceivable by persons having ordinary skill in the art within the scope of claims and are included in the technical scope disclosed herein.

In the embodiment described above, the clutch mechanism 200 is provided on the power transmission path between the torque converter 11 and each of the mechanical oil pump 13 and the first gear train 15. The clutch mechanism 200 may be provided on any power transmission path between the engine 3 and the driving wheel 9. For example, the clutch mechanism 200 may be provided on a power transmission path between the crankshaft 3a and the torque converter 11.

According to the embodiment of the disclosure, it is possible to improve the power generation efficiency during the stop of the vehicle.

The invention claimed is:
1. A vehicle comprising:
an engine;
an electric generator coupled to the engine;
a power transmission device configured to transmit driving power of the engine to a driving wheel of the vehicle;
a clutch provided in the power transmission device and switchable between an engaged state in which the driving power of the engine is transmitted to the driving wheel and a disengaged state in which the driving power of the engine is not transmitted to the driving wheel; and
a power generation controller configured to drive the engine and cause the electric generator to generate electric power by using the driving power of the engine,
wherein the clutch is switched to the disengaged state in a case where the vehicle is determined to be intended to stop for a predetermined period or longer while in a power generation-only range based on a driving state or location of the vehicle, wherein a select lever of transmission is not switchable to the power generation-only range unless the select lever is temporarily set to a parking range.

2. The vehicle according to claim 1, wherein the clutch is switched to the disengaged state in a case where the vehicle is determined to be intended to stop for the predetermined period or longer when a parking lock pawl locks a rotation of a shaft of the power transmission device.

3. The vehicle according to claim 1, wherein the clutch is switched to the disengaged state in a case where the vehicle is determined to be intended to stop for the predetermined period or longer when a parking brake locks a rotation of the driving wheel.

4. The vehicle according to claim 1, wherein the clutch is switched to the disengaged state in a case where the vehicle is determined to be intended to stop for the predetermined period or longer based on positional information of the vehicle.

5. The vehicle according to claim 1, wherein the clutch is switched to the disengaged state in a case where the vehicle is determined to be intended to stop for the predetermined period or longer when positional information of the vehicle includes a parking area.

6. The vehicle according to claim 1, wherein the clutch is switched to the disengaged state in a case where the vehicle is determined to be intended to stop for the predetermined period or longer when the shift position of a select lever is switched to the power generation only range.

7. The vehicle according to claim 1, wherein a clutch mechanism is disengaged from an engaged position when the vehicle is determined to be parked and intending to stop the vehicle continuously for the predetermined period or longer.

8. The vehicle according to claim 1, wherein a clutch mechanism is disengaged and when a charge level of a battery is lower than a predetermined value and the power generation controller drives the engine and drives the electric generator with a motor function to generate electric power.

9. The vehicle according to claim 1, wherein a switching to the power generation-only range is permitted when a rotation of at least one of the driving wheels or the power transmission device is locked by either one of rotation restrictors.

10. The vehicle according to claim 9, wherein switching to the power generation-only range is prohibited when a lock by rotation restrictors is undone.

11. The vehicle according to claim 1, wherein the parking range, a reverse range, a neutral range, and a drive range are set as shift positions of the power transmission on a first path extending in a predetermined extending direction, and
wherein the power generation-only range is set on a second path extending from the first path in a direction intersecting the extending direction.

12. The vehicle according to claim 1, further comprising a rotation restrictor configured to apply a lock to rotation of at least one of the driving wheels or the power transmission device,
wherein a shift position of the power transmission is prohibited from being switched to the power generation-only range when the lock applied by the rotation restrictor is undone.

13. The vehicle according to claim 12, wherein the power generation-only range is different than the parking range.

14. A vehicle comprising:
an engine;
an electric generator coupled to the engine;
a power transmission device configured to transmit driving power of the engine to a driving wheel of the vehicle;
a clutch provided in the power transmission device and switchable between an engaged state in which the driving power of the engine is transmitted to the driving wheel and a disengaged state in which the driving power of the engine is not transmitted to the driving wheel; and
a power generation controller configured to drive the engine and cause the electric generator to generate electric power by using the driving power of the engine,
wherein the clutch is switched to the disengaged state in a case where a driver who drives the vehicle is determined to intend to stop the vehicle for a predetermined period or longer,
a select lever of transmission comprising, as shift positions, a parking range, a reverse range, a neutral range, a drive range, and a power generation-only range different from the parking range, the reverse range, the neutral range, and the drive range,
wherein the driver is determined to intend to stop the vehicle for the predetermined period or longer in a case where the shift position of the select lever of transmission is the power generation-only range.

15. The vehicle according to claim 14,
wherein the parking range, the reverse range, the neutral range, and the drive range are set on a first path extending in a predetermined extending direction, and
wherein the power generation-only range is set on a second path extending from the first path in a direction intersecting the extending direction.

16. The vehicle according to claim 15, further comprising a rotation restrictor configured to apply a lock to rotation of at least one of the driving wheels or the power transmission device,
wherein the shift position is prohibited from being switched to the power generation-only range when the lock applied by the rotation restrictor is undone.

17. The vehicle according to claim 14, further comprising a rotation restrictor configured to apply a lock to rotation of at least one of the driving wheels or the power transmission device,
wherein the shift position is prohibited from being switched to the power generation-only range when the lock applied by the rotation restrictor is undone.

18. A vehicle comprising:
an engine;
an electric generator coupled to the engine;
a power transmission device configured to transmit driving power of the engine to a driving wheel of the vehicle;
a clutch provided in the power transmission device and switchable between an engaged state in which the driving power of the engine is transmitted to the driving wheel and a disengaged state in which the driving power of the engine is not transmitted to the driving wheel;
a select lever of transmission comprising, as shift positions, a parking range, a reverse range, a neutral range, a drive range, and a power generation-only range different from the parking range, the reverse range, the neutral range, and the drive range; and a power generation controller configured to drive the engine and cause the electric generator to generate electric power by using the driving power of the engine, wherein the clutch is switched to the disengaged state when the shift position of the select lever of transmission is the power generation-only range.

\* \* \* \* \*